United States Patent
Ederer

(10) Patent No.: US 8,408,264 B2
(45) Date of Patent: Apr. 2, 2013

(54) APPARATUS FOR JOINING PLASTIC TUBES

(75) Inventor: Roland Ederer, Woerth/Donau (DE)

(73) Assignee: Krones AG (DE)

( * ) Notice: Subject to any disclaimer, the term of this patent is extended or adjusted under 35 U.S.C. 154(b) by 572 days.

(21) Appl. No.: 12/276,166

(22) Filed: Nov. 21, 2008

(65) Prior Publication Data

US 2009/0133821 A1    May 28, 2009

(30) Foreign Application Priority Data

Nov. 22, 2007 (DE) .......................... 10 2007 056 348

(51) Int. Cl.
*B65H 21/00* (2006.01)
(52) U.S. Cl. .................. 156/503; 156/507; 156/158
(58) Field of Classification Search .................. 156/501, 156/158, 157, 502–509
See application file for complete search history.

(56) References Cited

U.S. PATENT DOCUMENTS

| | | | |
|---|---|---|---|
| 43,458 A | 7/1864 | Moseley | |
| 2,518,076 A | 8/1950 | Scherig | |
| 4,328,066 A * | 5/1982 | Kiuchi et al. | 156/506 |
| 5,098,508 A * | 3/1992 | Mattil | 156/363 |
| 5,891,298 A * | 4/1999 | Kuroda et al. | 156/344 |
| 6,644,160 B1 | 11/2003 | Boselli | 83/518 |
| 6,733,609 B2 * | 5/2004 | Leonarda van Heck | 156/159 |
| 6,893,531 B1 * | 5/2005 | Todaro et al. | 156/304.3 |
| 7,175,729 B2 | 2/2007 | Nobbe | 156/250 |
| 7,389,628 B2 | 6/2008 | Deininger | 53/459 |
| 7,488,398 B2 | 2/2009 | Deininger | 156/73.1 |
| 2007/0079923 A1 * | 4/2007 | Deininger | 156/159 |

FOREIGN PATENT DOCUMENTS

| | | |
|---|---|---|
| DE | 180492 | 2/1905 |
| DE | 101 51 144 | 4/2003 |
| DE | 601 03 112 | 11/2004 |
| DE | 10 2005 018 546 | 11/2006 |
| GB | 1068915 | 5/1967 |
| WO | WO 2005/042347 | 5/2005 |
| WO | WO 2005/042348 | 5/2005 |
| WO | WO 2006/111332 | 10/2006 |

OTHER PUBLICATIONS

German Search Report, dated Sep. 23, 2010, 6 pgs.
European Search Report issued in corresponding Appln. No. 08169445.7-2307/2062721, dated Jan. 18, 2011 (6 pgs).

* cited by examiner

*Primary Examiner* — Katarzyna Wyrozebski Lee
*Assistant Examiner* — Scott W Dodds
(74) *Attorney, Agent, or Firm* — Hayes Soloway P.C.

(57) ABSTRACT

An apparatus and method for joining plastic tubes is provided. The apparatus comprises a treatment body which is arranged above a depositing surface of the apparatus and is guided over a joining section of the plastic tubes during the joining operation.

21 Claims, 5 Drawing Sheets

APPARATUS FOR JOINING PLASTIC TUBES

The present invention relates to an apparatus and a method for joining plastic tubes, and in particular those plastic tubes which are used for labelling containers. It is known from the prior art that, in order to label certain plastic containers, plastic tubes are pulled over the containers and then are shrunk onto the containers. Such plastic tubes are usually unwound from rolls and are pulled over the containers in a continuous process. Once a roll has been used up, usually the end section of this first roll is joined to a start section of a next roll while operation continues, and the further roll is then unwound. In order to bridge over the actual joining operation, which is carried out by hand, buffer arrangements are provided which provide material for labelling the containers during the joining operation.

In the prior art, it is necessary for the operating staff to manually join the end section of the used-up roll to a start section of a new roll after the end of each roll.

DE 601 03 112 T2 discloses a method for joining the end of a flattened tube of plastic film to the start of a subsequent tube. Here, the front edge of the start of the flattened tube is provided on both longitudinal edges with a corner which is cut at an angle, and in this way it is easier to bring it together with the respective other start section. However, it is always necessary to bevel the two corners and this operation has to be carried out with very high accuracy since otherwise the sections to be joined are offset at an angle from one another. Moreover, a tilting of the end sections may occur during the joining operation.

The object of the present invention is therefore to provide an apparatus and a method which allow easier joining of said end sections. Also to be provided are an apparatus and a method which ensure a very precise joining of the respective end sections to one another.

It is pointed out that both the apparatus according to the invention and also the installation and the preparation unit serve the same inventive purpose or perform the same inventive task.

An apparatus according to the invention for joining plastic tubes comprises a depositing surface on which an end section of a first plastic tube is deposited. The apparatus also comprises a fixing surface for temporarily fixing to the apparatus a region of this end section of the plastic tube. According to the invention, a movable treatment body for treating the end section of the plastic tube is provided above the depositing surface, wherein this treatment body can be moved relative to the depositing surface both in a longitudinal direction of the plastic tube and in a direction perpendicular to the depositing surface.

A treatment body is understood to mean a body which acts on a further body, here the plastic tube or the end section thereof. Preferably, this treatment body can be moved between at least two positions relative to the depositing surface, wherein the treatment body in a first position is arranged at least partially and preferably completely in front of the fixing surface in a transport direction of the plastic tube and with particular preference can be displaced in the direction of the fixing surface starting from this position. Preferably, the treatment body in a second position relative to the depositing surface may be arranged essentially at least partially and preferably completely above the fixing surface.

Prior to the operation of joining two end sections, preferably the first end section is divided into two regions, wherein a first region is held by the fixing surface and a second region is angled away from the first region. During the joining operation, the second end section which is to be joined to the first end section is introduced into an intermediate space between the two regions. At this point in time, the treatment body is arranged in front of the end section and also the two regions in the transport direction of the plastic tube, so as not to hinder the introduction of the second end section.

Once the second end section has been introduced, the treatment body is guided both in the transport direction of the plastic tube and also preferably onto the end sections of the two plastic tubes, which have already been brought together, in order to consolidate the joining of these end sections.

The treatment body is preferably arranged on the apparatus; however, it would also be possible for the treatment body to be arranged on an installation and for the apparatus to be moved relative to this installation.

A fixing surface is understood to mean a surface or a surface section which temporarily holds the end section or a part of this end section by certain means. Preferably this is a suction strip which draws this corresponding end section towards it. However, electrostatic holding means or the like could also be provided.

This fixing surface causes the end section to be held at least before and during the actual joining operation. Once the joining operation is complete, the respective end section or a region of this end section is released again. Preferably, the plastic tube is a flattened plastic tube, i.e. a tube which comprises essentially two parallel surfaces and two edges on the left-hand and right-hand side. In the region of the end section, the upper surface is separated from the lower surface, i.e. in particular these two edges are opened up.

The first region then bears against the fixing surface and the second region is held for example in a position angled away from the first region, for example by means of a holding rod which will be explained in detail below. On the one hand, one of the two regions can bear against the treatment body before the actual joining operation, and on the other hand the treatment body then causes the two regions to be pressed against one another. In order to be able to prepare the end section in a particularly favourable manner for the joining operation, according to the invention the treatment body can be moved on the one hand perpendicular to the depositing surface so that it can be raised upwards, and on the other hand can also be moved in the longitudinal direction of the plastic tube in order to assist the joining operation. The longitudinal direction of the plastic tube is understood to mean the direction in which the plastic tube essentially extends. Here, this is preferably also the transport direction, along which the plastic tube is transported. Preferably, the treatment body is an elongate body which extends perpendicular to a plane defined by the longitudinal direction and the direction running perpendicular to the depositing surface.

Preferably, the treatment body comprises at least one roller which can rotate about a rotation axis which is perpendicular to a plane defined by the transport direction and the direction perpendicular to the depositing surface. This roller thus preferably extends from one longitudinal edge of the plastic tube to the other longitudinal edge. The advantage of an embodiment as a roller lies in the fact that, once the end sections have been joined, this roller-like treatment body can be rolled over the joining section in order to consolidate the join.

Preferably, the treatment body is arranged on the apparatus such that it can pivot about a predefined pivot axis. Advantageously, a cantilever arm is provided which is arranged pivotably on the apparatus at one end and comprises the treatment body or the rotation axis of this treatment body at its second end. By virtue of this pivoting movement, in particular a movement of the treatment body in the direction perpendicular to the depositing surface is also achieved.

Furthermore, the treatment body is also arranged such that it can be displaced in the longitudinal direction of the plastic tube relative to the depositing surface. For this purpose, a carriage may be provided which extends in the longitudinal direction of the plastic tube and also in the longitudinal direction of the depositing surface, and along which the roller can be displaced. With particular preference, therefore, the separating device is arranged such that it can be both pivoted and displaced relative to the depositing surface. As mentioned above, the displaceability serves to consolidate the joining region after a splice between the end sections has been established.

In a further preferred embodiment, the apparatus comprises a holding rod which is arranged parallel to the treatment body. It is possible that, during the joining operation, which as explained below is carried out automatically, the angled-away region of the end section is prevented by this holding rod from moving towards the first region, which is held by the fixing surface. Preferably, therefore, this holding rod is at least temporarily provided between the first region of the end section and the second region of the end section. Preferably, this holding rod can be placed in a groove, wherein the groove is designed in such a way that the holding rod can nevertheless be fixed in a predefined end position.

In a further advantageous embodiment, provided on the depositing surface are at least two positioning pins which can be displaced in a direction perpendicular to the depositing surface. During the joining operation, these positioning pins can pass through corresponding holes or openings which have already been made beforehand in the plastic tube, and thus ensure a precise geometric fixing of the plastic tube relative to the depositing surface. In order to actuate these two positioning pins, there may be provided in particular, but not exclusively, pneumatic, mechanical or magnetic drives.

In a further advantageous embodiment, arresting means are provided which arrest the treatment body in a predefined position relative to the fixing surface and also relative to the depositing surface.

The present invention also relates to an installation for joining plastic tubes, comprising at least one apparatus of the type described above. In addition, this installation comprises a guiding device which guides up to the plastic tube an end section of a further plastic tube which is to be joined to the end section of this plastic tube. This further plastic tube is preferably the end section of the roll which has just been completely unwound. This end section is joined to a start section of the next roll.

Preferably, the installation comprises a plurality of apparatuses of the type described above, and the guiding device can be moved between these apparatuses. Preferably in this case, this guiding device can be moved in a direction perpendicular to the transport direction and can in this way be guided towards each individual one of the abovementioned apparatuses. The installation as a whole also comprises a roll magazine, in which there is provided a plurality of rolls which are provided with the plastic tubes. Unlike in the prior art, a manual intervention by the user for each roll change is not necessary, but rather said user need only prepare a certain number of end sections at the start of the process and the actual joining process is then carried out automatically.

Preferably, the guiding device comprises a drive which serves to displace the guiding device towards the individual apparatuses according to the invention. With particular advantage, the apparatuses according to the invention are themselves designed without drives. In this way, the joining process can be carried out in a particularly rational manner with particularly few drives.

It is pointed out that, in the context of the present description, the treatment body is provided directly on the abovementioned apparatus. However, it would also be possible that the apparatus is designed without the treatment body, and instead a corresponding treatment body is provided on the guiding device.

In a further advantageous embodiment, the installation comprises a sensor device which detects a geometric position of the end section of the plastic tube. Preferably, this is an optical sensor which detects a position perpendicular to the transport direction of the plastic tube. This optical sensor may be arranged on each of the abovementioned apparatuses, but with particular preference it is located on the guiding device. Advantageously, the installation also comprises a control device which controls the movement of the guiding device in reaction to a position detected by the sensor. In this way, a particularly precise alignment of the respective end sections of the plastic tubes with respect to one another is possible.

In a further advantageous embodiment, the guiding device comprises a drive device which moves the treatment body relative to the depositing surface. As mentioned above, the apparatus for joining the end sections is particularly preferably free of any drive, and a corresponding drive is located in the guiding device. In this way it is possible to save costs.

The present invention also relates to a preparation unit for preparing plastic tubes which are to be joined. This preparation unit comprises a depositing surface on which an end section of a plastic tube can be deposited. Also provided are fixing means for fixing the end section at least temporarily, wherein these fixing means are preferably coupled to a cutting device for cutting the plastic tubes. According to the invention, the preparation unit comprises punching means which make holes in the plastic tubes, and these punching means are coupled to the actuation element in such a way that, during a predefined actuation of the actuation element, both a cutting operation and a punching operation are carried out.

By virtue of this coupling, it is achieved in a particularly simple manner that on the one hand the end section of the plastic tube is cut at a certain point and on the other hand also the two holes are produced which subsequently serve for the positioning pins of the above-described apparatus and thus for positioning the plastic tube relative to this apparatus. In one advantageous embodiment, the punching means comprises two pins which are spaced apart from one another, wherein with particular advantage the distance between the spaced-apart pins is variable. In this way, the preparation unit can also be adapted to different widths of the respective plastic tubes.

The present invention also relates to a method for joining plastic tubes, wherein in a first step an end section of a first plastic tube is prepared and this end section is deposited on an apparatus for joining plastic tubes. In a further method step, an end section of a second plastic tube is guided up to the end section of the first plastic tube, and in a further method step the end section of the first plastic tube is joined to the end section of the second plastic tube at a predefined joining section.

According to the invention, the end section of the first plastic tube is at least temporarily fixed relative to the apparatus, wherein a treatment body provided above the depositing surface is moved relative to the depositing surface during the joining operation both in a longitudinal direction of the plastic tube and also in a direction perpendicular to the depositing surface.

Advantageously, the first end section of the first plastic tube is provided with a self-adhesive material. More specifically, the two regions of the end section which are separated from one another are optionally provided with a self-adhesive material and are pressed for joining purposes against the end section of the second plastic tube which is to be joined.

Preferably, the treatment body is moved over the joining section after the end sections have been joined. In this way, as already mentioned above, the splice is further consolidated.

Advantageously, the end section is prepared by means of a preparation unit of the type described above.

Advantageously, the end sections are also joined by means of an apparatus of the type described above.

Further advantages and embodiments will emerge from the appended drawings:

In the drawings:

FIG. 1b shows a cross-sectional view of an apparatus shown in FIG. 1a;

FIG. 2a shows a perspective view of a guiding device according to the invention for joining plastic tubes, without the apparatus of FIG. 1a;

FIG. 2b shows the guiding device of FIG. 2a with an apparatus according to FIG. 1a;

FIG. 3a shows a side view of the diagram shown in FIG. 2a;

FIG. 4a shows a first view of a sensor device for the installation of FIG. 3a;

FIG. 4b shows a perspective view of the sensor device of FIG. 4a;

FIG. 5b shows a further view of the preparation unit of FIG. 5a.

Figure 1A:
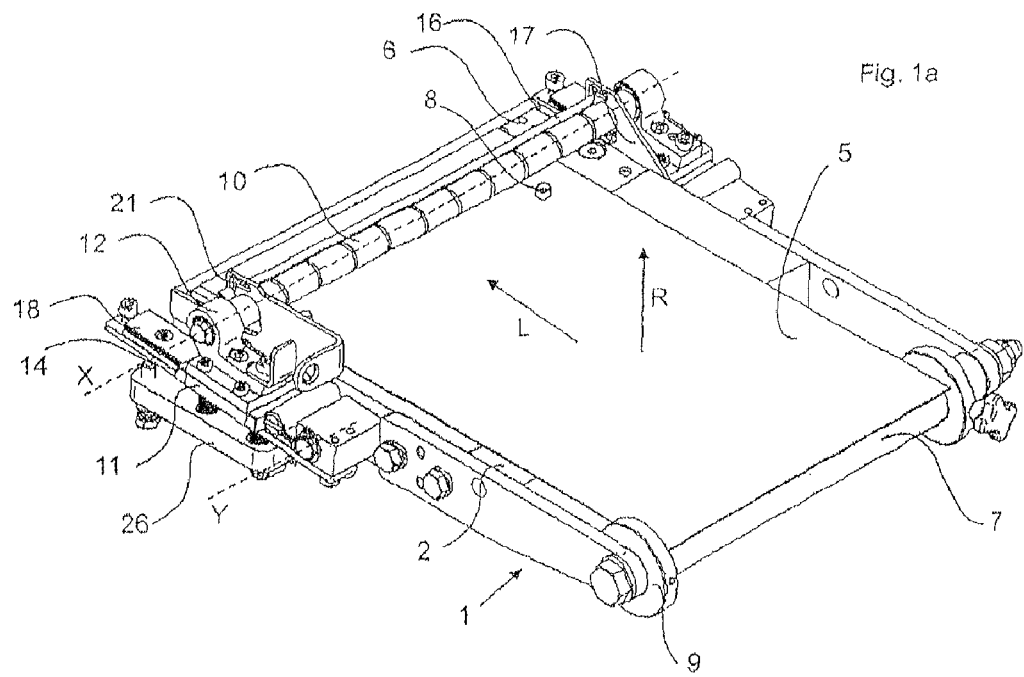
FIG. 1a shows a perspective view of an apparatus according to the invention for joining plastic tubes.

FIG. 1 shows an apparatus according to the invention for joining plastic tubes. Here, reference 2 denotes a depositing surface which is largely hidden and on which a plastic tube 5 bears, said plastic tube being shown only in part. In use, the plastic tube does not end at the edge shown but rather leads further to a roll magazine and in particular to a roll, onto which the plastic tube is wound. To this end, the plastic tube 5 is deflected over a deflection roller 7. Reference 9 denotes side discs which serve for aligning the plastic tube with respect to the apparatus 1.

In the front region of the apparatus, there is a fixing surface 6 (also largely hidden) which serves for temporarily fixing the plastic tube 5. Said fixing surface is preferably a suction strip which draws an end region of the plastic tube 5 towards it by means of a vacuum. Reference L denotes a longitudinal direction of the plastic tube and at the same time also that direction along which the plastic tube is transported during operation. Reference R denotes a direction perpendicular to the depositing surface 2.

Positioning pins 8 serve for the precise positioning of the plastic tube 5, which positioning pins pass through holes already punched through the plastic tube 5 beforehand and in this way position the latter.

Reference 10 denotes a treatment body which is designed here as a roller, wherein this roller 10 is preferably made from a rubber material. Provided parallel to the treatment body 10 is a holding rod 16 which is partially hidden by the treatment body 10 in FIG. 1. This holding rod 16 serves for threading-in an end section of the plastic tube and for spatially separating the end section at least temporarily in the direction of the treatment body 10 into two regions 5a, 5b. For this purpose, the holding rod 16 is or the end sections of the holding rod 16 are guided in an angled groove 21. These grooves 21 are in turn arranged on a holding plate 17, which at the same time also serves as an arresting means for the treatment body 10.

Reference 12 denotes a mount for the treatment body or the end sections thereof, wherein this mount, as explained below, is also suitable for being guided by a corresponding machine element of an installation for joining plastic tubes. Furthermore, the treatment body 10 is arranged such that it can pivot via a cantilever arm 11 relative to a pivot axis Y and thus also relative to the depositing surface 2. It is pointed out here that, in the embodiment shown in FIG. 1, the treatment body 10 is ultimately also arranged on the apparatus 1. However, it would also be possible to arrange the treatment body 10 not on the apparatus 1 itself but rather on a further element of the installation for joining plastic tubes. Reference 14 denotes a carriage which can be displaced relative to a support 18. In this way, a movement of the treatment body 10 in the longitudinal direction L can also be carried out. Reference 26 denotes a fixing body, by means of which the apparatus 1 can be fixed to a rail (not shown) running perpendicular to the longitudinal direction L. The treatment body 10 is arranged here such that it can rotate about a rotation axis X, which is likewise perpendicular to the longitudinal direction L.

Figure 1B:
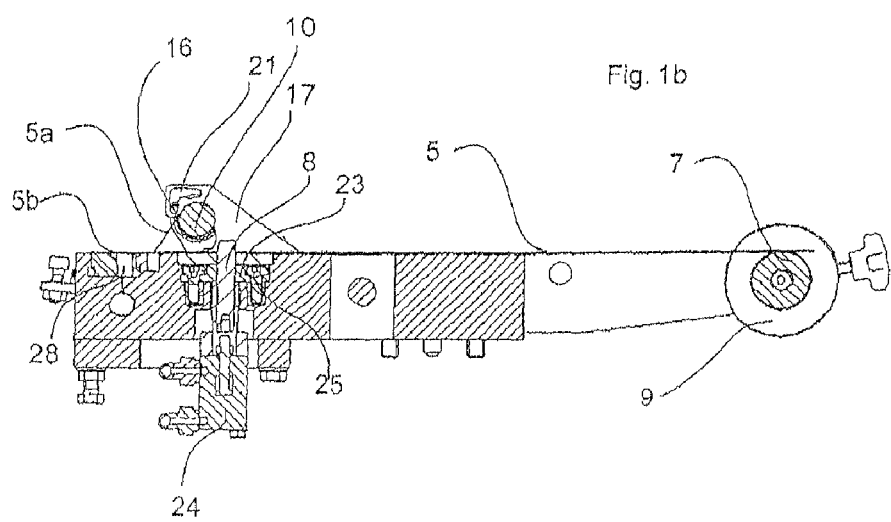

FIG. 1b shows a cross-sectional view of the apparatus shown in FIG. 1a. It can be see here that the plastic tube 5 or the respective end section 5 of the plastic tube has already been separated at its end into a region 5b and a region 5a. The region 5b is drawn towards the fixing device 6 (FIG. 1), and the region 5a is inserted between the treatment body 10 and the holding rod 16 and is held there. For this purpose, the holding rod 16 is arranged at its lower position in the angled groove 21.

For joining purposes, an adhesive such as a double-sided adhesive tape for example is applied both to the region 5a and to the region 5b of the plastic tube. Reference 28 denotes an opening which forms part of the suction strip 6. Reference 8 once again denotes the positioning pin, which can be raised and lowered by means of a pneumatic device 24. Here, the actuation of this pneumatic device 24 is synchronised with further elements of the installation as a whole. Reference 23 denotes a displacement device, by means of which the positioning pin 8 including the pneumatic device 24 can be displaced in a direction perpendicular to the plane of the figure. Reference 25 denotes fixing means such as screws, which fix the positioning pin in a certain position.

Figure 2A:
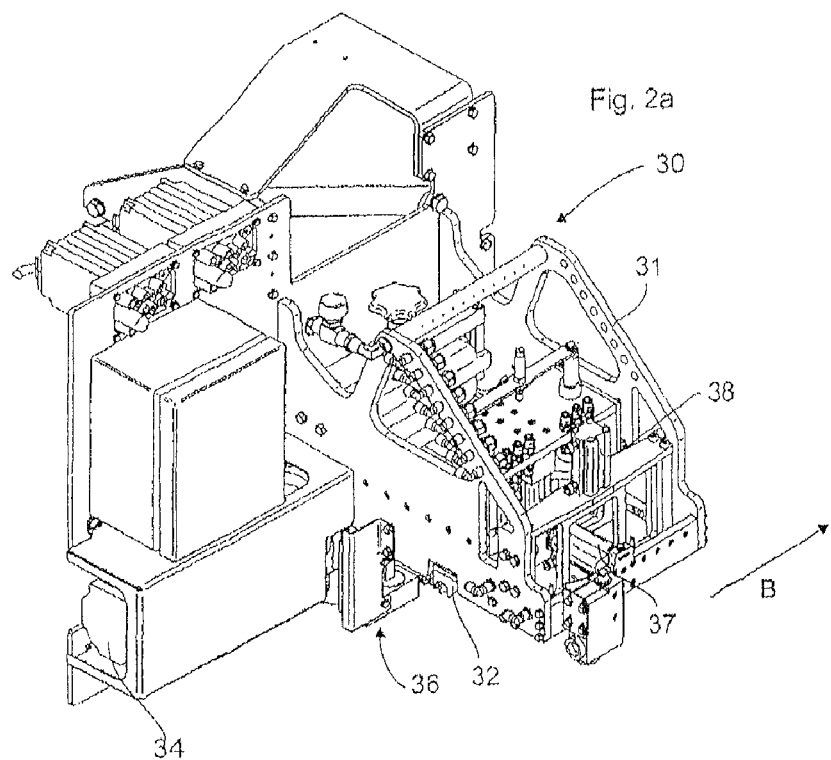

FIG. 2a shows a guiding device 30 according to the invention for joining plastic tubes, and the guiding device shown in FIG. 2a is displaced during operation in the movement direction B between individual apparatuses 1 (cf. FIG. 1a), wherein this movement direction B coincides with the direction of the rotation axis X shown above. Here, a plurality of pneumatic cylinders 37, 38 are arranged on a frame 31, along with a sensor device 36 which serves to determine the position of the plastic tube and thus to obtain a precise alignment of the guiding device 30. Reference 34 denotes a drive device such as a motor, which transports or conveys the plastic tube during operation. By means of a clamp 32, as will be explained in more detail below, the mount 12 is gripped and displaced in accordance with the individual method steps.

Figure 2B:
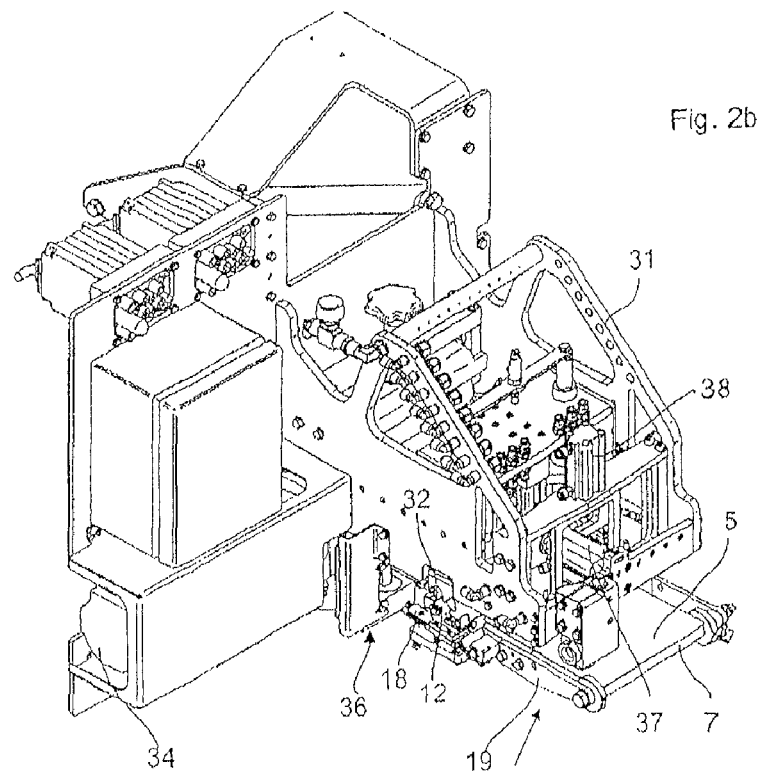

FIG. 2b shows the installation of FIG. 2a, wherein in this position the apparatus 1 is also shown. It can be seen here that the clamp 32 is able to grip the mount 12. Reference 19 denotes a frame of the apparatus 1.

Figure 3A:
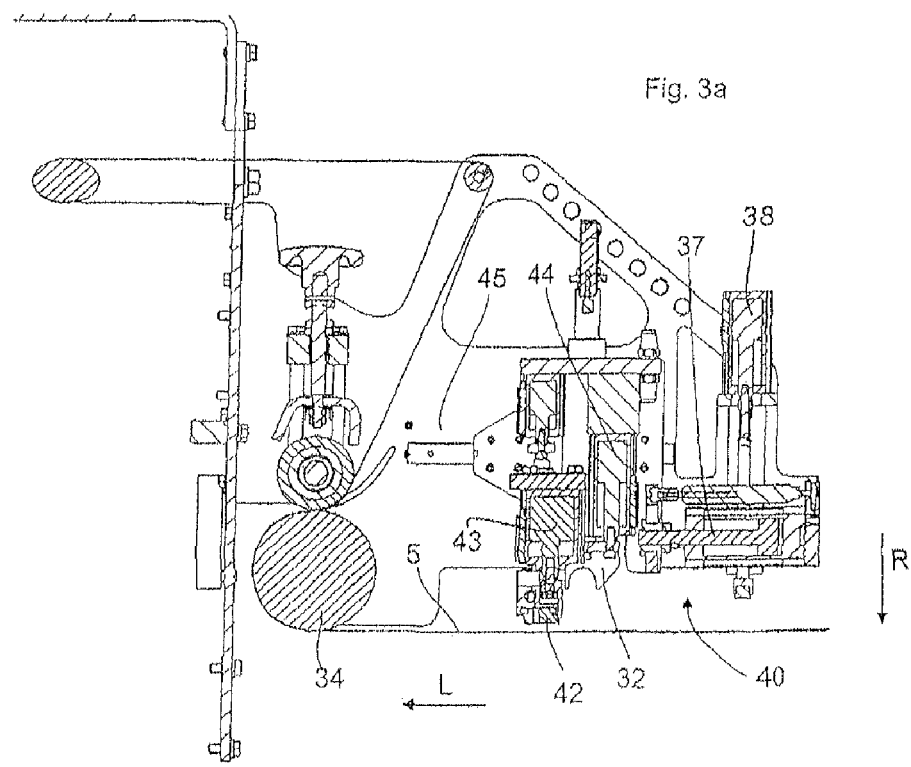

FIG. 3a shows a cross-sectional view of the apparatus shown in FIG. 2a, wherein the apparatus 1 according to the invention is not present here. Reference 37 denotes a pneumatic arrangement for a horizontal displacement of the entire joining mechanism relative to a support 45. Reference 44 denotes a further pneumatic unit, by means of which the clamp 32 can be displaced in the vertical direction, i.e. the direction R. During this vertical movement, as mentioned above, the mount 12 of the apparatus 1 is gripped and thus the treatment body 10 can also be moved both in the vertical direction and also in the longitudinal direction L. The plastic tube 5 is moved along during operation by a drive shaft 34.

Figure 3B:
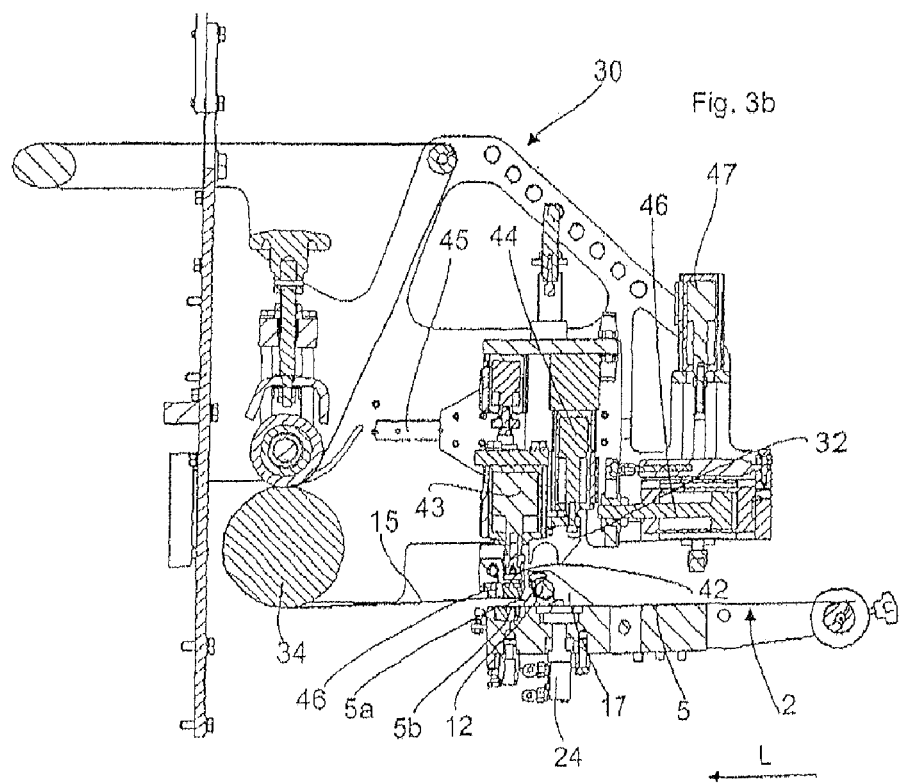
FIG. 3b shows a side view of the diagram shown in FIG. 2b.

FIG. 3b shows a view of the installation of FIG. 3a, wherein here the apparatus 1 is also included. It can be seen here that the end section of the plastic tube 5 is to be joined to a corresponding end section of a further plastic tube 15. For this purpose, firstly the guiding device 30 is displaced perpendicular to the plane of the figure so that the two end sections 5 and 15 are positioned precisely relative to one another. In order to achieve this, use is made, as mentioned above, of a sensor device which determines the position of the plastic tube 15 and 5 in the direction perpendicular to the plane of the figure. The end section 15 is then pressed onto the region 5b of the plastic tube 5 by means of the plunger 42.

A further fixing device 46, such as a suction strip, is provided on the plunger 42. In a further method step, the mount 12 and thus also the treatment body 10 is pushed downwards by means of the clamp 32 and then the region 5a of the plastic tube 5 is placed over the other end section of the further plastic tube 15 by means of a horizontal movement in the direction L. With the double-sided adhesive tapes which are used, a splice is in this way established between the two plastic tubes 5 and 15. In order to improve the splice, the treatment body 10 is rolled over the joining point between the two plastic tubes 5, 15 and in this way fixes the splice. The treatment body 10 is then released again by withdrawing the clamp 32. Preferably, therefore, the apparatus 1 comprises a spring device (not shown) which biases the treatment body in the direction R away from the depositing surface 2 of the apparatus 1.

Figure 4A:
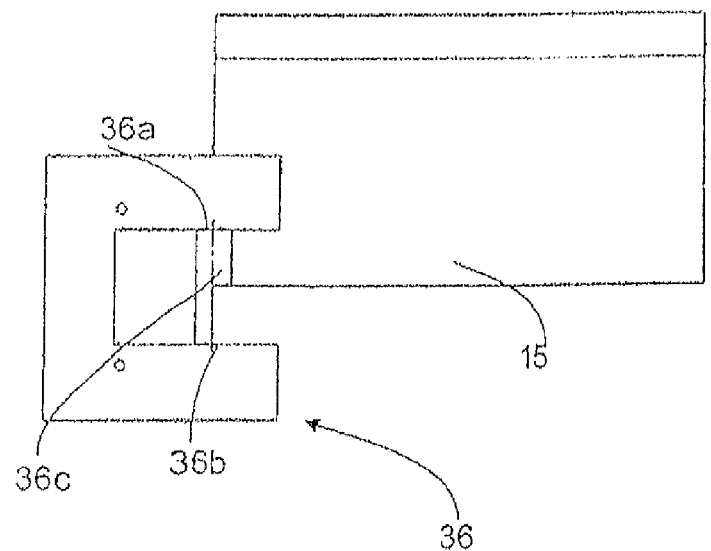

FIG. 4a schematically shows a sensor device 36 which is arranged on the guiding device 30 and serves for determining the precise position of the plastic tube 15. Here, this sensor device 36 is an optical sensor device 36. Starting from an emitter device 36a, the beam 36c is sent in the direction of a receiver or detector 36b. If the plastic tube 15 is at a predefined position relative to the sensor device, this can be determined by the beam impinging on the receiver 36b.

Figure 4B:
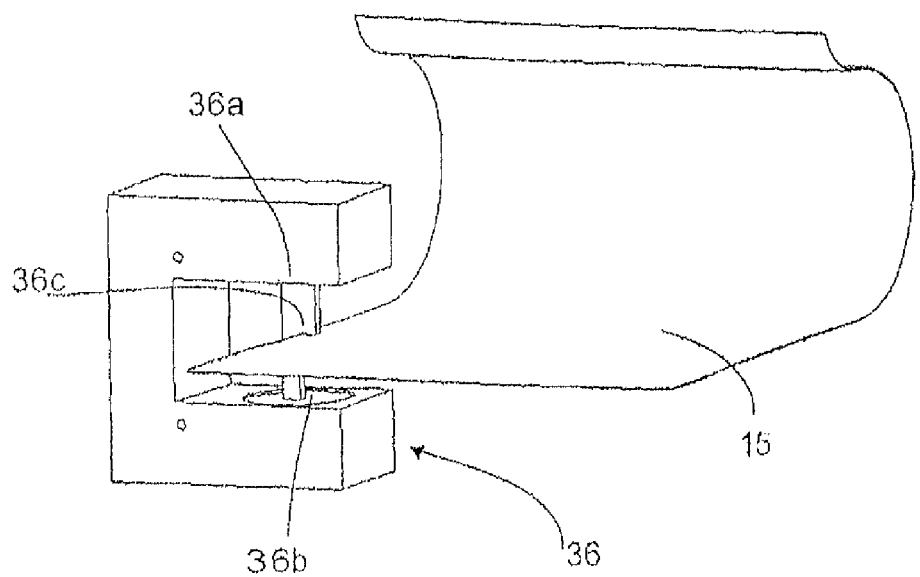

FIG. 4b shows a perspective view of the sensor device. The signal output from the receiver 36b depends on what proportion of the beam 36c is hidden by the plastic tube 15. In this way, a very exact positioning of the plastic tube 15 relative to the plastic tube 5 (not shown) is possible.

Figure 5A:
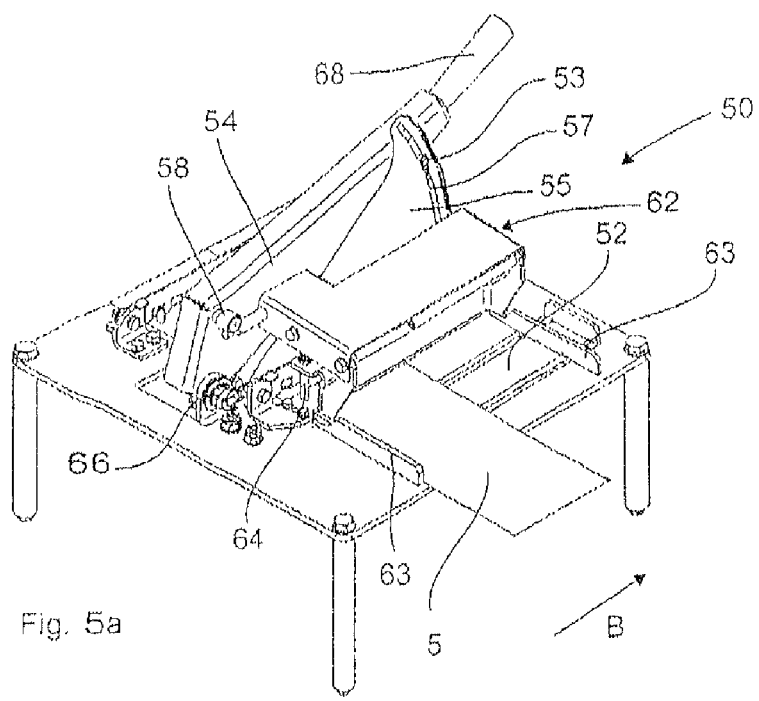
FIG. 5a shows a first view of a preparation unit according to the invention.

FIG. 5a shows a first view of a preparation unit 50 according to the invention for preparing an end section of a plastic tube 5. This preparation unit 50 comprises a tray 52 on which the end section of the plastic tube 5 is deposited. Also provided is an actuation element 54 in the form of a lever with a handle 68 arranged thereon. By actuating this actuation element, both a cutting operation and also a punching operation are triggered. Arranged on the actuating element 54 is a protrusion or a bolt 53 which is arranged in a groove 57 of a fixing plate 55. Preferably, this fixing plate 55 also serves to fix the plastic tube 5 temporarily relative to the depositing surface 52 during the actuation process. Reference 62 denotes in its entirety a punching means for simultaneously also punching holes in the plastic tube 5 in addition to the actual cutting operation. A further bolt 58 is provided on the actuation element 54, which further bolt also simultaneously moves the punching means 62 during an actuation of the actuation element. The actuation element 54 is arranged such that it can pivot with respect to a pivot axle 66. Reference 63 denotes edges which serve for positioning the plastic tube. At least one of these edges is adjustable in the direction B. Reference 64 denotes a pin which is pushed through the plastic film during the actual punching operation. The position of this pin 64 is also adjustable in the direction B.

Figure 5B:
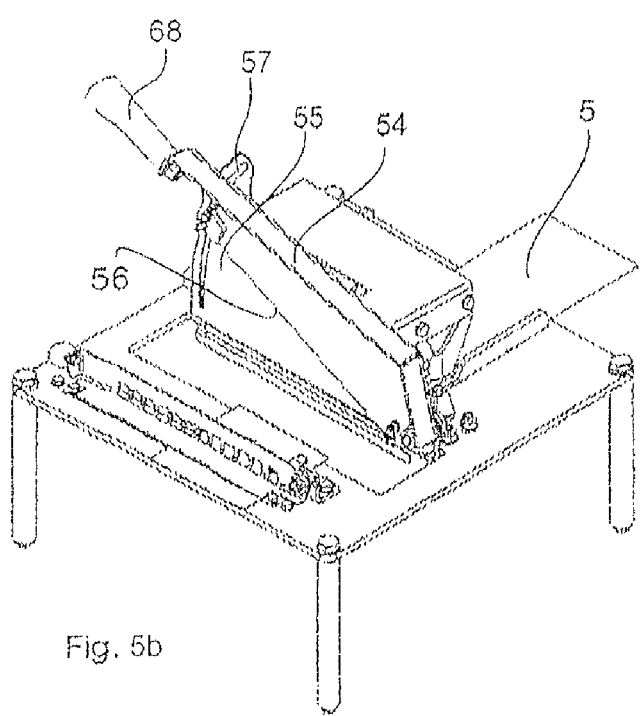

FIG. 5b shows a further view of the preparation unit shown in FIG. 5a. Here, reference 56 denotes a cutting element or a cutting edge which serves for cutting the plastic tube 5.

All of the features disclosed in the application documents are claimed as essential to the invention in so far as they are novel individually or in combination with respect to the prior art.

The invention claimed is:

1. An apparatus for joining an end section of a first roll of plastic tubes to a start section of a second roll of plastic tubes, comprising a surface on which an end section of a first plastic tube is deposited, and comprising a fixing surface for temporarily fixing to the apparatus a region of the end section of the first plastic tube, wherein a movable treatment body for treating the end section of the first plastic tube is provided above the depositing surface, wherein the treatment body is movable relative to the depositing surface both in a longitudinal direction (L) along which the plastic tubes are transported during operation and in a direction (R) perpendicular to the depositing surface, wherein the treatment body comprises at least one roller which is pivotable about a rotation axis (X) which is perpendicular to a plane defined by the directions (R) and (L) and wherein the roller is arranged to roll over joining end sections in order to consolidate the join, wherein the apparatus further comprises a holding rod which is arranged parallel to the treatment body, and wherein the holding rod serves to spatially separate the end sections of a plastic tube, at least temporarily, in the direction of the treatment body into two regions.

2. The apparatus according to claim 1, wherein the treatment body is arranged on the apparatus such that it is pivotable about a predefined pivot axis (Y).

3. The apparatus according to claim 1, wherein the treatment body is movable between at least two positions relative to the depositing surface, wherein the treatment body in a first position is arranged at least partially in front of the fixing surface in the longitudinal direction (L) of the first plastic tube.

4. The apparatus according to claim 1, wherein provided on the depositing surface are at least two positioning pins which can be displaced in the direction (R) perpendicular to the depositing surface.

5. The apparatus according to claim 1, wherein an arresting device is provided which arrest the treatment body in a predefined position relative to the fixing surface.

6. An installation for joining plastic tubes, comprising at least one apparatus according to claim 1, and a guiding device for guiding up to the first plastic tube an end section of a second plastic tube which is to be joined to the end section of the first plastic tube.

7. An installation for forming plastic tubes, comprising a plurality of apparatuses according to claim 1, and a guiding device for guiding up to the first plastic tube an end section of a second plastic tube which is to be joined to the end section of the first plastic tube, wherein the guiding device is movable between these apparatuses.

8. The installation according to claim 6, wherein the installation comprises a sensor device for detecting a geometric position of an end section of the first plastic tube.

9. The installation according to claim 6, wherein the guiding device comprises a drive device for moving the treatment body relative to the depositing surface.

10. The apparatus according to claim 1, wherein the roller extends from one longitudinal edge of the first plastic tube to the other longitudinal edge.

11. The apparatus according to claim 1, wherein a cantilever arm is arranged pivotably on the apparatus at one end of the treatment body at its second end.

12. The apparatus according to claim 1, wherein a carriage along which the roller is displaced extends in the longitudinal direction of the plastic tubes and in the longitudinal direction of the surface.

13. The apparatus according to claim 1, wherein the holding rod is at least temporarily provided between a first region of an end section and a second region of an end section.

14. The apparatus according to claim 1, wherein end sections of the holding rod are guided in an angled groove, which also serves as an arresting means for the treatment body, wherein the holding rod which is placed in the groove can nevertheless be fixed in a predefined end position.

15. The apparatus according to claim 1, wherein side discs serve for aligning the first plastic tube with respect to the apparatus.

16. The apparatus according to claim 1, wherein the fixing surface is a suction strip which draws an end region of the first plastic tube toward it by means of a vacuum.

17. The apparatus according to claim 4, wherein the positioning pins which serve for precise positioning of the plastic tubes pass through holes already punched through the plastic tube beforehand and in this way positioning the plastic tube.

18. The installation according to claim 6, wherein the installation comprises a roll magazine, in which there is provided a plurality of rolls which are provided with the plastic tubes.

19. The installation according to claim 8, wherein the installation comprises a control device which controls the movement of the guiding device in reaction to a position detected by the sensor.

20. The apparatus according to claim 1, wherein the first plastic tube comprises essentially two parallel surfaces, a upper surface or first region of the end section and a lower surface or second region of the end section.

21. An apparatus for joining an end section of a first roll of plastic tubes to a start section of a second roll of plastic tubes, comprising a surface on which an end section of a first plastic tube is deposited, and comprising a fixing surface for temporarily fixing to the apparatus a region of the end section of the first plastic tube, wherein a movable treatment body for treating the end section of the first plastic tube is provided above the depositing surface wherein the treatment body is movable relative to the depositing surface both in a longitudinal direction (L) along which the plastic tubes are transported during operation and in a direction (R) perpendicular to the depositing surface, wherein the treatment body comprises at least one roller which is pivotable about a rotation axis (X) which is perpendicular to a plane defined by the directions (R) and (L) and wherein the roller is arranged to roll over joining end section in order to consolidate the join, wherein the apparatus further comprises a holding rod which is arranged parallel to the treatment body, and wherein end sections of the holding rod are guided in an angled groove, which also serves as an arresting means for the treatment body, wherein the holding rod which is placed in the groove can nevertheless be fixed in a predefined end position.

* * * * *

UNITED STATES PATENT AND TRADEMARK OFFICE
CERTIFICATE OF CORRECTION

| | | |
|---|---|---|
| PATENT NO. | : 8,408,264 B2 | Page 1 of 1 |
| APPLICATION NO. | : 12/276166 | |
| DATED | : April 2, 2013 | |
| INVENTOR(S) | : Ederer | |

It is certified that error appears in the above-identified patent and that said Letters Patent is hereby corrected as shown below:

In the Claims

Claim 21, Col. 10, line 16, "surface wherein" should be --surface, wherein--.

Signed and Sealed this
Twelfth Day of August, 2014

Michelle K. Lee
*Deputy Director of the United States Patent and Trademark Office*